Jan. 1, 1963

M. L. HOFFMANN 3,071,173

AUTOMOBILE TRACTION DEVICE

Filed Sept. 12, 1961

INVENTOR.
Martin Luther Hoffmann
BY
Paul & Paul
ATTORNEYS.

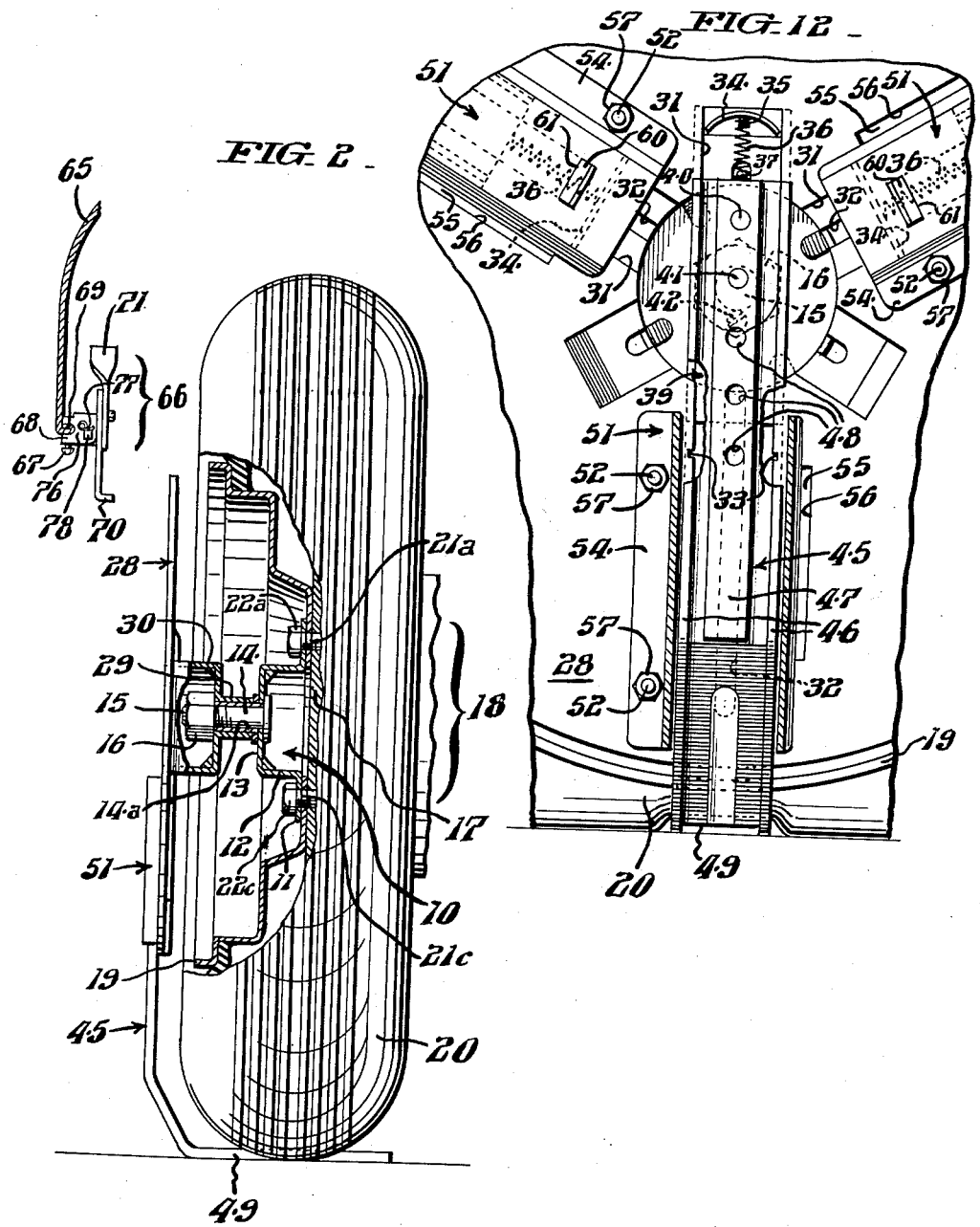

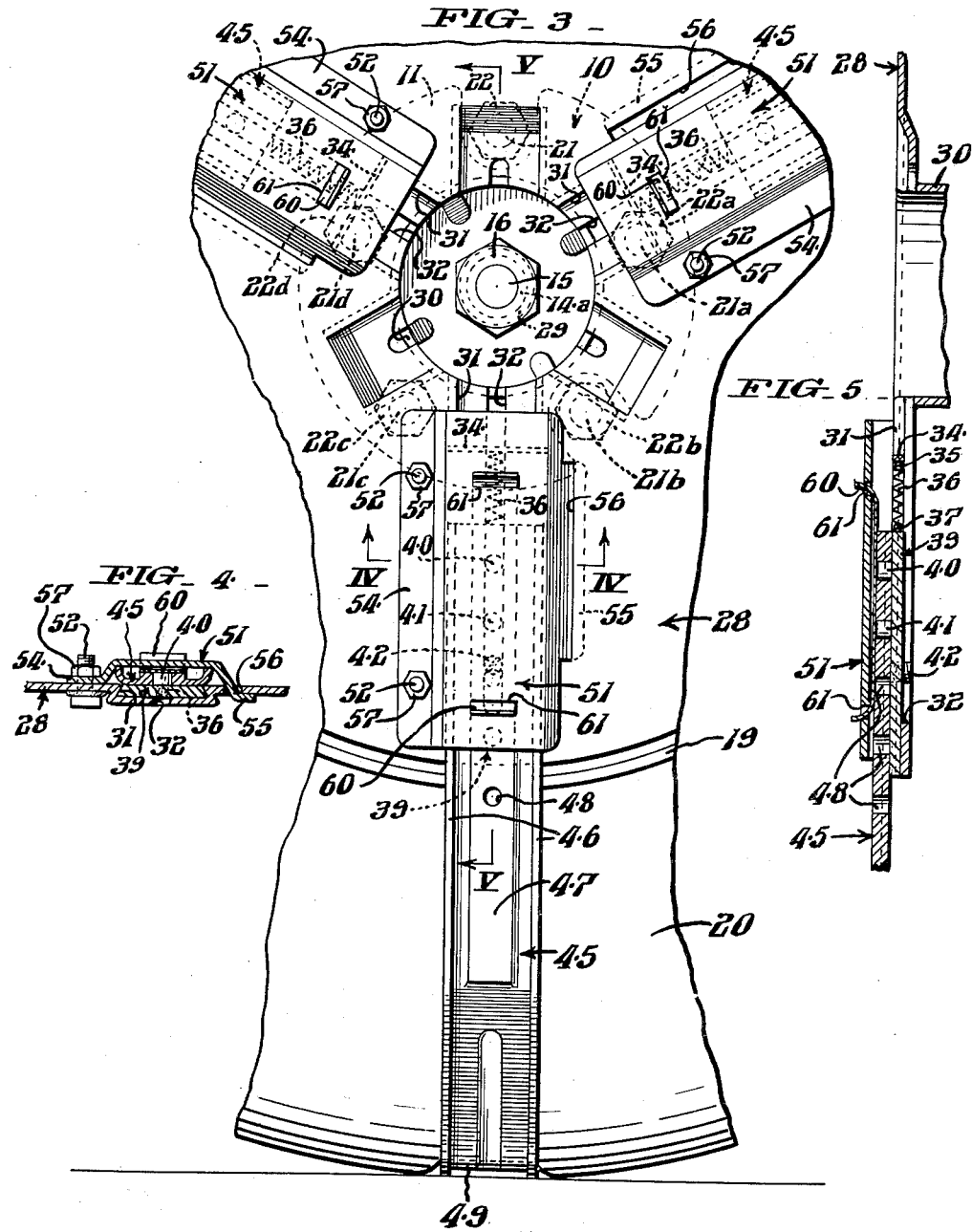

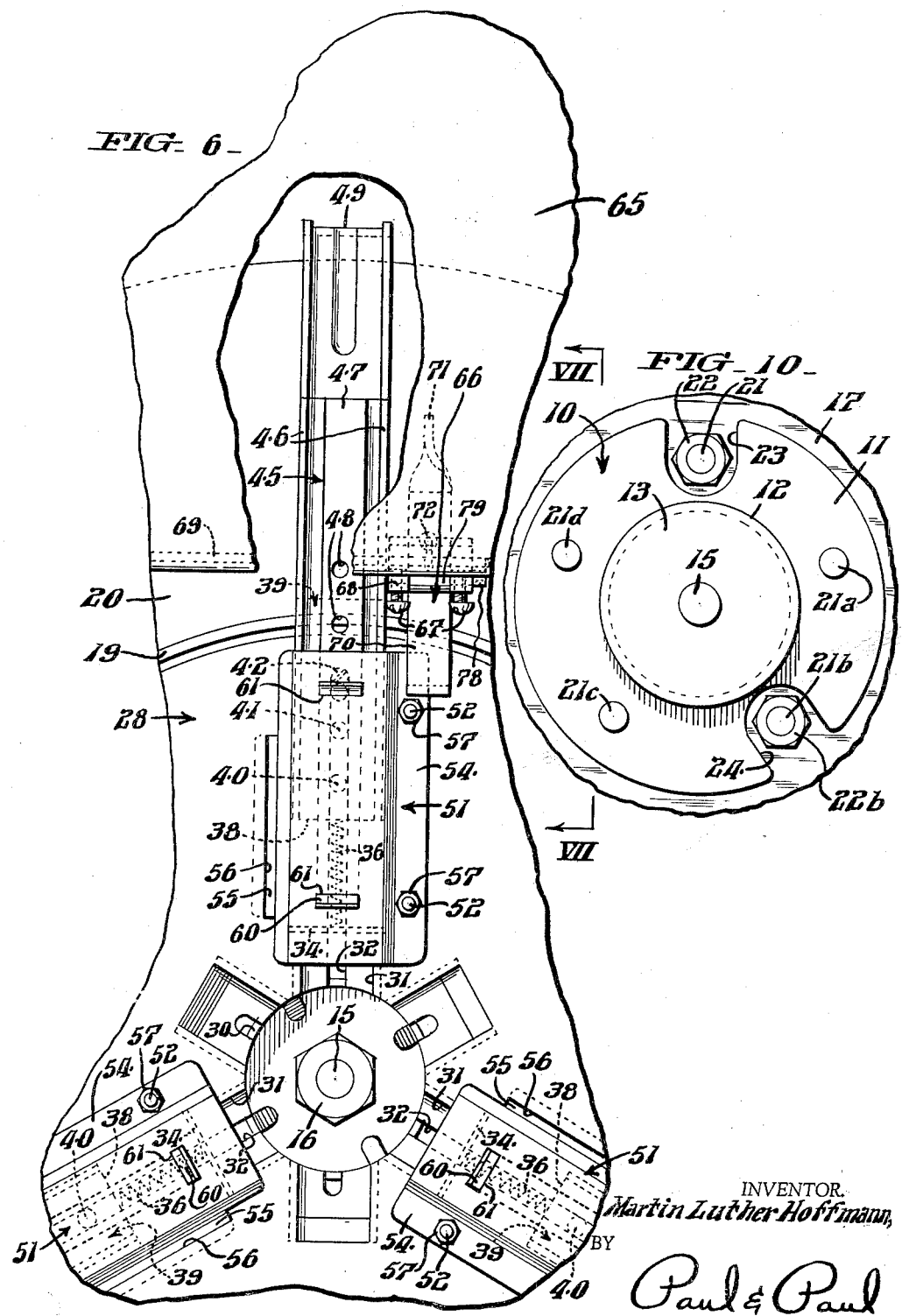

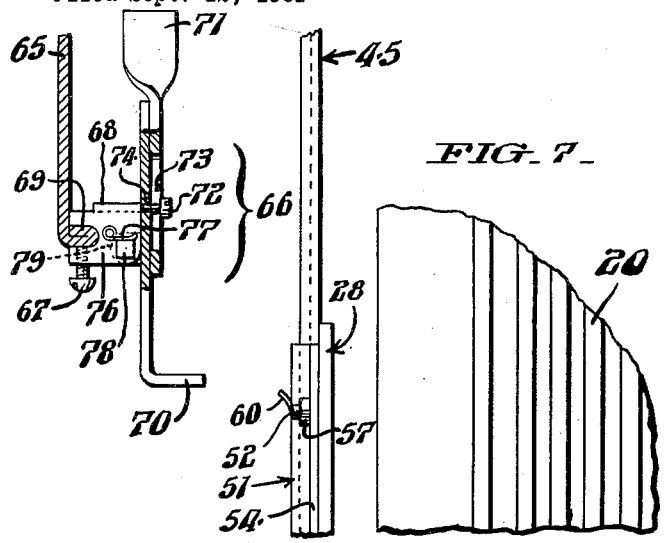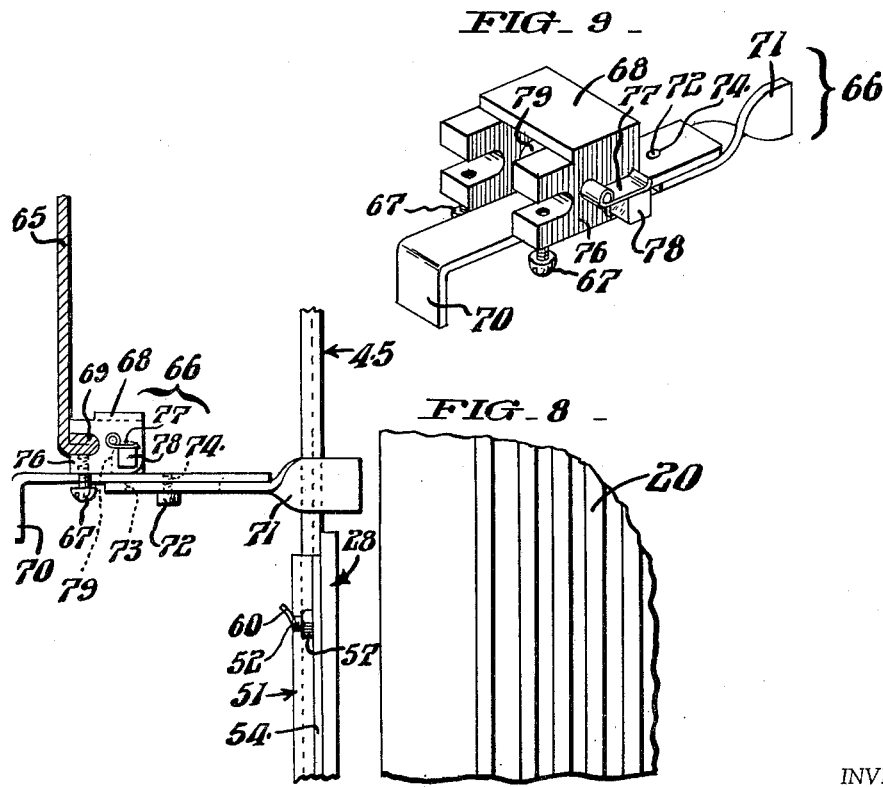

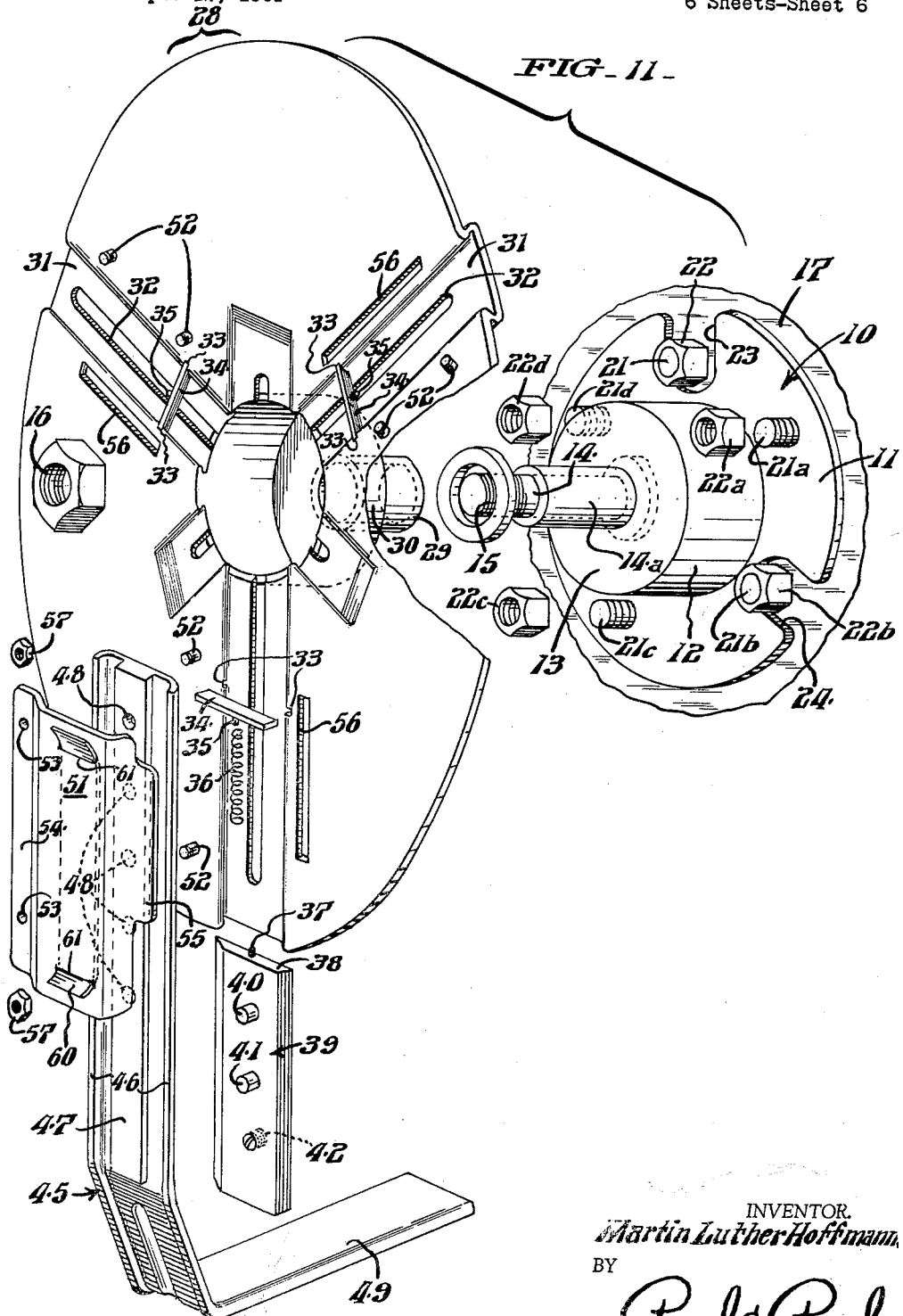

United States Patent Office 3,071,173
Patented Jan. 1, 1963

3,071,173
AUTOMOBILE TRACTION DEVICE
Martin Luther Hoffmann, Haddon Heights, N.J.
Filed Sept. 12, 1961, Ser. No. 137,647
11 Claims. (Cl. 152—216)

This invention relates to traction devices. More particularly this invention relates to improved traction means for the wheels of automotive vehicles.

It is an object of this invention to provide new and improved traction means for the driving wheels of automotive vehicles which is especially adapted for use on icy, snowy, muddy or other slippery road surfaces.

It is another object of this invention to provide a novel traction device for attachement to the driving wheels of automotive vehicles which is sturdy and efficient, and which is both relatively simple in design and economical to produce.

It is another object of this invention to provide a traction device for attachment to the driving wheels of automotive vehicles which is adapted to the rapid and easy installation thereof.

It is another object of this invention to provide a traction device for the driving wheels of automotive vehicles which is adapted for attachment thereto without raising said wheels from the surface of the ground.

It is another object of this invention to provide improved traction means for the driving wheels of automotive vehicles having component elements which may be permanently attached to said vehicles for use in providing additional traction when desired without impairing or interfering with the normal operation or appearance of the vehicle.

It is another object of this invention to provide an improved traction device for the driving wheels of automotive vehicles which may be made operative for driving said vehicles on slippery road surfaces and alternatively inoperative when driving on normal road surfaces.

Other objects and attendant advantages of the invention will appear hereinafter and in the drawings wherein:

FIG. 2 is an end elevational view, partly broken away and partly in section, of a traction device mounted as in FIG. 1;

FIG. 3 is a magnified view in side elevation of a part of the traction device mounted as in FIG. 1;

FIG. 4 is a cross sectional view of the traction device taken as indicated by the lines and arrows IV, IV of FIG. 3;

FIG. 5 is a cross sectional view of the traction device taken as indicated by the lines and arrows V, V of FIG. 3;

FIG. 6 is a magnified view in side elevational of the traction device showing another arrangement thereof;

FIG. 7 is a view in end elevation, partly broken away, of the traction device taken as indicated by the lines and arrows VII, VII of FIG. 6 showing one specific arrangement thereof;

FIG. 8 is a view in end elevation of the traction device similar to FIG. 7 showing another specific arrangement thereof;

FIG. 9 is a view in perspective of a stop element of the traction device;

FIG. 10 is a view in side elevation of a component part of the traction device;

FIG. 11 is an exploded view in perspective of the traction device;

FIG. 12 is a magnified view in side elevation showing still another specific arrangement of the traction device.

Figure 1:
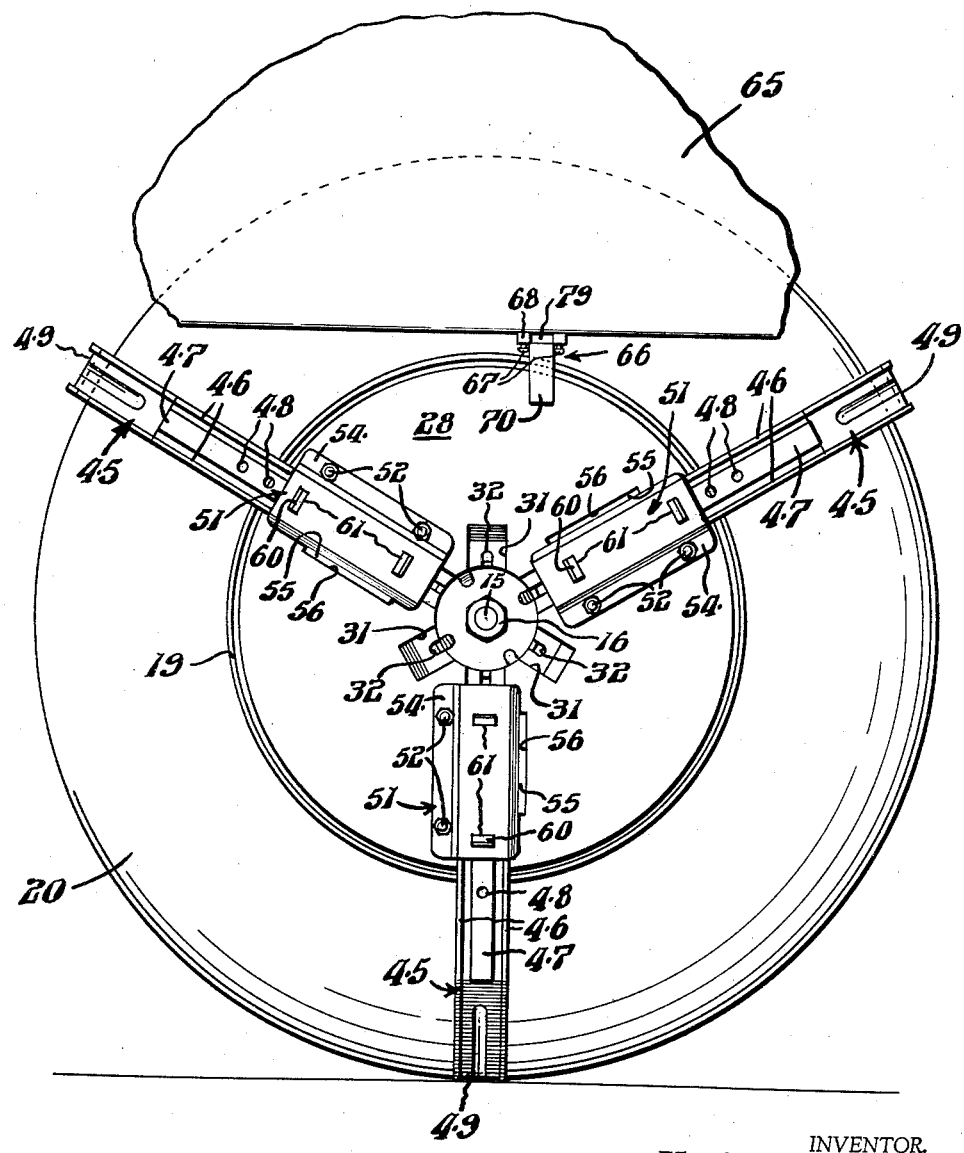
FIG. 1 is a side elevational view of a traction device as provided in accordance with this invention mounted to the wheel of an automotive vehicle.

The following description is directed to the specific form of the invention illustrated in the drawings and is not intended to be addressed to the scope of the invention itself which may be practiced in a wide variety of forms and arrangements.

Adverting herewith to the specific form of the invention illustrated in the drawings, a traction device as provided in accordance with this invention comprises a hub cup or plate 10 having a flat annular flange 11 and a generally cylindrical hub section 12 from which there extends centrally of the front surface 13 thereof an axle 14 having a threaded end 15 adapted to receive a threaded nut 16. The hub cup 10 is secured to a hub 17 of a drive wheel 18 to rim 19 of which there is mounted a tire 20. Bolts 21, 21a, 21b, 21c and 21d affixed to a disc mounted to the axle of the automobile extend through the hub 17 and are threaded to receive nuts 22, 22a, 22b, 22c and 22d. As may be seen in FIGS. 10 and 11, bolts 21a, 21c and 21d extend through holes provided for that purpose in the flange 11 of the hub cup 10. Indentations 23 and 24 are further provided in the flange 11 of the hub cup 10 to permit the reception of nuts 22 and 22b on the bolts 21 and 21b without contacting the flange 11. The nuts 22a, 22c and 22d are received on the bolts 21a, 21c and 21d and tightened to contact the flange 11 of the hub cup 10, thereby securing the cup 10 to the hub 17 of the wheel 18.

A support plate 28 is mounted on the axle 14 of the hub cup 10 by means of a generally cylindrical sleeve 29 which fits over the bushing 14a. Extension 30 is disposed axially of the support plate 28 and extends perpendicularly from the rear face thereof. Formed in the support plate 28 are radial grooves 31, each of which have a guide slot 32 formed centrally therein and extending longitudinally thereof. Notches 33 are formed in the opposite walls of the grooves 31 for the reception of flexible metal stop bars 34 which are disposed in each of said grooves for a purpose to be explained more fully hereinafter.

Disposed on the front face of the stop bar 34 is a pin 35 adapted to enter the end of a correspondingly dimensioned spring 36 arranged to receive in the opposite end thereof a second pin 37 formed on a longitudinal end 38 of a base plate 39 suitably dimensioned to enter the groove 31 and slide longitudinally backward and forward therein. The base plate 39 is provided additionally with pins 40 and 41 on the top surface thereof and a guide screw 42 extending therethrough and arranged to enter the guide slot 32, all for a purpose to be explained more fully hereinafter.

A generally L-shaped gripper strip 45 having flanged edges 46 and a medial ridge 47 in which are disposed holes 48 of suitable dimension to receive pins 40 and 41 of the base plate 39 is adapted to enter the groove 31 and slide longitudinally back and forth therein. As may be seen in FIG. 2, section 49 of the generally L-shaped gripper strip 45 extends generally parallel to the axle of the wheel 18 adjacent the outer periphery of the tire 20.

A support bracket 51 is mounted to the support plate 28 by means of bolts 52 affixed in the aforesaid support plate 28 adjacent the grooves 31, which bolts extend through holes 53 provided for that purpose in a flange 54 formed longitudinally at one side of the bracket 51. On the opposite side of bracket 51 is formed a curved flange 55 which is adapted to enter a slot 56 formed in the support plate 28 adjacent the grooves 31, as seen in FIG. 11. The flange 55 is arranged for retention in the slot 56 when nuts 57 are applied to the threaded ends of bolts 52 extending through the holes 53 in the flange 54 of the bracket 51. A flat spring 60 is provided in the bracket 51 adjacent the inside face thereof and retained in that position by the engagement of the ends thereof through slots 61 formed at the opposite longitudinal ends of the bracket.

To a fender 65 adjacent the tire 20 and the gripper strips 45 there is affixed a stop element 66 by means of screws 67 extending through the wall of a fitting 68 of the stop element shaped to receive a flange 69 of the fender 65. As may be seen in FIGS. 7–9, stop element 66 comprises a lever 70 pivotally mounted to the fitting 68 and arranged to swing through an arc of approximately 90° from the generally vertical position shown in FIG. 7 to the generally horizontal position shown in FIG. 8. An extendable arm 71 is secured to the lever 70 by means of a screw 72 which is arranged to pass through a slot 73 formed centrally in the arm 71 and extending longitudinally thereof and to pass into a threaded hole 74 formed in the lever 70 for that purpose. To a side 76 of the fitting 68 there is mounted a flat spring 77 which is arranged to abut a four-sided block 78 mounted to an end of a pivot pin or roller 79 extending across the width of the fitting 68 and arranged for rotation therein. The lever 70 is arranged for rotation with the pivot pin 79.

In accordance with the present invention, the traction device as described in the foregoing detailed description is installed on the drive wheel 18 of the automotive vehicle by first removing the hub cap of the wheel and thereafter removing the nuts 22a, 22c and 22d from the bolts 21a, 21c and 21d extending through the hub 17. Thereafter the axle member or hub cup 10 is applied to the hub 17 so that the bolts 21a, 21c and 21d pass through the holes provided for that purpose in the flange 11 of the hub cup 10, after which the bolts 22a, 22c and 22d are again applied respectively to the bolts 21a, 21c and 21d and tightened against the flange 11. In applying the hub cup 10 to the hub 17 the spaced indentations 23 and 24 are arranged to receive the bolts 21 and 21b from which the nuts 22 and 22b are not loosened but allowed to remain tight on their respective bolts against the hub 17 of the wheel 18. After the hub cup 10 has been secured in position on the hub 17, the support plate 28 is mounted to the axle 14 of the hub cup by sliding the sleeve 29 onto the axle 14 so that the threaded end 15 thereof extends into the cylindrical section 30 of the support plate 28. Thereafter the nut 16 is applied to the threaded end 15 of the axle and tightened sufficiently to retain the support plate 28 on the axle but at the same time to allow the free rotation of the support plate 28 on the bushing 14a. After the support plate 28 has been secured in position on the axle 14 the base plate 39 is slid into the groove 31 so that the guide screw 42 enters the guide slot 32 and so that the pins 35 and 37 of the stop bar 34 and the base plate 39 respectively, enter the opposite ends of the spring 36. It will be clear that the stop bar 34 is retained in the notches 33 provided in the side walls of the groove 31. Thereafter the gripper strip 45 is placed in the groove 31 so that the pins 40 and 41 of the base plate 39 enter the selected holes 48 formed in the medial ridge 47 of the gripper strip. The holes 48 which are selected for reception by the pins 40 and 41 of the base plate 49 are those which position the section 49 of the gripper strip 45 adjacent the periphery of the tire 20 so that the aforesaid section avoids contact with the tire. It will be clear that in positioning the gripper strip 45 of the base plate 39, the base plate is positioned in the groove 31 so that the guide screw 42 abuts the terminal end of the guide slot 32. When the gripper strip 45 has been positioned as desired, the bracket 51 is fitted to the support plate 28 by inserting the flange 55 into the slot 56 and passing the bolts 52 through the holes 53 in the flange 54 after which the nuts 57 are applied to the bolts 52 and tightened to secure the bracket in position. When the bracket 51 has been mounted to the face plate 28, the flat spring 60 presses against the guide strip 45 and the support plate 39.

After assembling and installing the traction elements of the device as aforedescribed, the stop element 66 is mounted to the fender 65 adjacent the wheel 18, as shown in FIG. 2, so that the lever 70 and the arm 71 are positioned substantially parallel to the surface of the fender. The fitting 68 is fitted over the flange 69 on the fender and the screws 67 tightened to secure the stop element 66 in position.

In normal operation when it is desired to use the traction device to secure additional traction on icy or otherwise slippery road surfaces, the stop element is maintained in the position shown in FIG. 7, thereby allowing the free rotation of the gripper strips 45 about the wheel 18 and the tire 20. It will be clear that when the traction device has been assembled and installed as aforedescribed, the support plate 28 rotates freely around the axle 14 and accordingly, the gripper strips 45 rotate independently of the wheel 18.

In ordinary operation the gripper strips 45 contact the tire 20 only at that point in the revolution thereof when gripper strip and tire are both tangent to the road surface. By reason of the weight of the vehicle and the power of the drive wheel, the gripper strips 45 prevent the wheels from spinning on the slippery surface owing to the simultaneous contact of the gripper strip with the tread of the tire and the slippery road surfaces. It will be clear that section 49 of the gripper strip 45 bears against both the road surface and the tire 20 when the aforesaid tire and gripper strip are tangent to the road by reason of the fact that the gripper strip slides upward in the groove 31 against the compression force of the spring 36 which is compressed between the base plate 39 and the stop bar 34. As the gripper strip is thrown upward around the wheel from its position in contact with the road surface, the spring 36 forces the base plate 39 outward toward the periphery of the support plate 28 so that the guide screw 42 again abuts the end of the slot 32, thereby forcing the gripper strip outward away from the tread of the tire to allow the traction device to rotate freely to bring the next succeeding gripper strip into contact with the road surface.

The flexible stop bar 34 is arranged so that excessive pressure applied to the gripper strip 45 will force the stop bar 34 out of notches 33 and cause it to slide along the groove 31 thereby permitting the gripper strip 45 to slide upward in the groove 31 substantially as seen in FIG. 12. Release of the stop bar 34 from the notches 33 is particularly important on those occasions when a flat tire occurs, thereby appreciably reducing the diameter of the wheel 18, which reduced diameter would cause the full weight of the vehicle to be borne by the relatively narrow gripper strip 45. Accordingly, when the diameter of the wheel has been reduced, the weight of the vehicle releases the stop bar as aforedescribed and permits the gripper strip 45 to move upward in the groove 31, thereby preventing damage to the traction device.

Wherever it is desired to render the traction device temporarily inoperative, the stop mechanism 66 is utilized to prevent the rotation of the gripper strips 45. When the arm 71 of the stop element 66 is vertically disposed as shown in FIG. 7, the gripper strips 45 are free to rotate about the wheel 18 to supply additional traction thereto. However, when the arm 71 of the stop element 66 is pulled to the horizontal position shown in FIG. 8, the lever arm 71 contacts the gripper strip 45 to prevent its rotation about the wheel 18 and positioning the gripper strips about the wheel so that none of the gripper strips come into contact with the road surface at any time, all substantially as shown in FIG. 6.

It will be evident that in those circumstances when slippery surfaces are not likely to be encountered for substantial periods of time, such as in the summertime, the gripper strips 45 may be dismounted from the support plate 28 without any need for dismounting the hub cup 10 and the support plate 28 itself mounted thereto. On the contrary, the hub cup and support plate may be allowed to remain mounted to the wheel 18 and covered by a suitable hub cap provided for that purpose.

It will be apparent that it is an important feature of the traction device as provided in accordance with this invention that the semi-permanent installation thereof provides for especially easy and rapid assembly of the traction elements to the wheel of the automotive vehicle when needed.

Another important advantage of the invention resides in the manner of construction of the traction device as provided in accordance therewith whereby the traction elements may be made operative or inoperative as desired thereby eliminating the need for dismounting the traction elements during those periods when slippery surfaces are only intermittently encountered.

Although this invention has been described with reference to specific forms and embodiments thereof, it will be evident that a great number of variations may be made without departing from the spirit or the scope of this invention. For example, parts may be reversed, equivalent elements may be substituted for those specifically disclosed, and certain features of the invention may be used independently of other features, all without departing from the spirit or scope of this invention as defined in the appended claims.

Having thus described my invention, I claim:

1. A traction device for an automotive vehicle comprising an axle member adapted for bolting to a wheel of said vehicle adjacent the hub thereof, a support plate mounted to said axle member and arranged for free rotation thereon, said support plate having a radial groove formed therein extending to the periphery thereof, an elongated traction element slidably arranged in said groove, said traction element being arranged to extend adjacent the periphery of said wheel and rotate thereabout, means disposed in said groove for positioning said traction element, said positioning means including a base plate, a spring bar and a stop bar, said base plate and said stop bar being arranged to compress said spring therebetween, and means attached to said support plate for retaining said traction element in said groove.

2. The traction device defined in claim 1 wherein said spring is supported at the opposite ends thereof by pins correspondingly disposed in said stop bar and said base plate.

3. The traction device defined in claim 1 wherein said base plate has formed thereon a plurality of pins, wherein said traction device has formed therein medially of the edges thereof a plurality of correspondingly dimensioned holes and wherein said pins are adapted for selective reception in said holes.

4. The traction device defined in claim 3 wherein said retaining means for said traction element comprises a bracket, said bracket having a flange on one side thereof adapted to enter a slot formed adjacent said groove in said support plate and a flange on the opposite side thereof adapted to be secured to bolts affixed to said support plate on the opposite side of said groove.

5. The traction device defined in claim 4 wherein a spring is disposed on said bracket and arranged to bear against said traction element and said base plate.

6. The traction device defined in claim 5 wherein said base plate carries a guide pin adapted to enter a guide slot formed in said groove and extending longitudinally thereof.

7. The traction device defined in claim 6 wherein said spring normally urges said base plate outwardly in said groove toward the periphery of said support plate whereby said traction element is urged away from the periphery of said wheel.

8. The traction device defined in claim 7 wherein said stop bar comprises a strip of flexible spring metal and is disposed in opposing notches formed in the walls of said grooves, said stop bar being arranged to slip out of said notches and slide inwardly in said groove toward the center of said support plate upon the application of a predetermined pressure radially exerted on said traction element.

9. The traction device defined in claim 8 wherein said traction element is generally L-shaped, one section thereof being disposed substantially parallel to the side of said wheel and another section thereof being disposed substantially parallel to the axis of said wheel.

10. The traction device defined in claim 9, wherein a stop element is disposed on said vehicle adjacent said wheel, said stop element comprising a pivoted lever arranged to stop the rotation of said traction element and position said element to prevent the contact thereof with the road surface.

11. The traction device defined in claim 10 wherein a plurality of said traction elements are disposed in a plurality of radial grooves formed in said support plate.

References Cited in the file of this patent

UNITED STATES PATENTS

| | | |
|---|---|---|
| 1,593,129 | Matthews | July 20, 1926 |
| 1,882,376 | Weber | Oct. 11, 1932 |
| 2,517,634 | Daley | Aug. 8, 1950 |